No. 784,176.

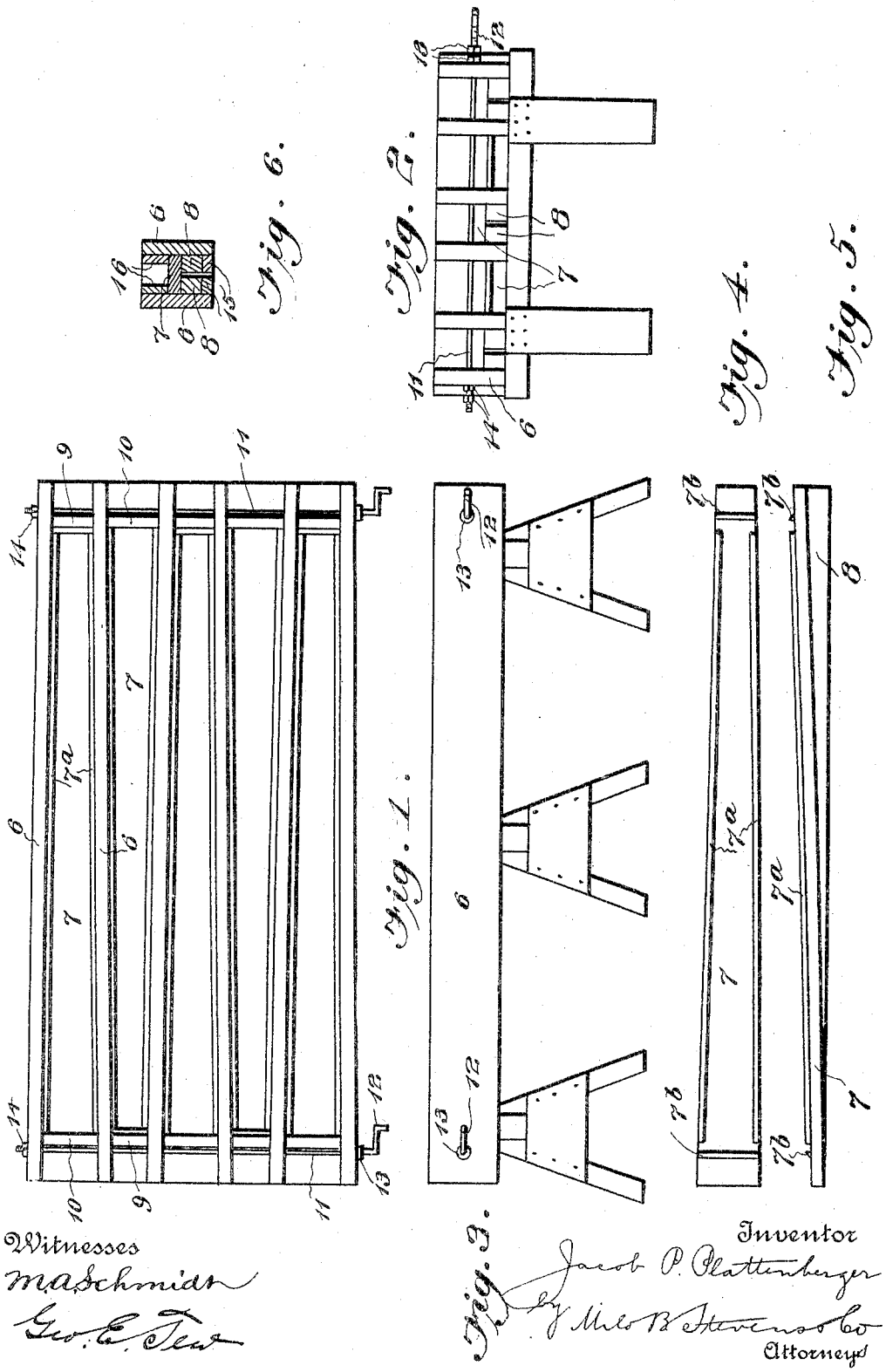

Patented March 7, 1905.

UNITED STATES PATENT OFFICE.

JACOB P. PLATTENBERGER, OF SAVANNA, ILLINOIS.

MOLD.

SPECIFICATION forming part of Letters Patent No. 784,176, dated March 7, 1905.

Application filed February 8, 1904. Serial No. 192,554.

*To all whom it may concern:*

Be it known that I, JACOB P. PLATTENBERGER, a citizen of the United States, residing at Savanna, in the county of Carroll and State of Illinois, have invented new and useful Improvements in Molds, of which the following is a specification.

This invention relates particularly to molds for molding fence-posts. Its main object is to provide a mold in which a considerable number of fence-posts may be molded at the same time.

A further object is to construct such a mold so that it may be adjusted or varied in size to mold posts of different sizes.

A further object is to produce a mold cheap and simple in construction and operation with intent to place it within the ability of any average man to mold and make his own fence-posts.

A further object is to produce a knockdown mold which may be taken apart and packed in comparatively small space.

In the accompanying drawings, wherein the invention is illustrated, Figure 1 is a plan view of the mold arranged to mold five posts at once. Fig. 2 is an end elevation thereof. Fig. 3 is a side elevation. Figs. 4 and 5 are respectively top and side views of one of the mold-bottoms. Fig. 6 is a vertical section of a mold adjusted to smaller size.

The mold is preferably and conveniently made of boards, although iron plates may be substituted, if desired.

Referring specifically to the drawings, the molds are shown arranged to cast tapering posts, and the wide and narrow ends of the posts are arranged alternately next each other, so as to economize space and permit the use of a single board or side between each mold.

The side boards of the molds are indicated at 6 and are of somewhat greater length than the posts to be made, and the arrangement is such that the inner boards form the sides of two molds, as shown. The mold-bottoms are indicated at 7. These are positioned between the side boards and taper in width according to the taper of the posts to be made. They are also caused to taper in height or thickness or to rest at an inclination between the side boards by means of wedge-shaped pieces 8, fastened thereunder. These pieces raise the small end of the bottoms to a proper height to give the resulting posts the desired taper. At the side edges the bottom boards 7 have miter or beveled strips 7$^a$ to produce a flat corner on the posts and at each end have cleats 7$^b$, against which the top and bottom pieces 9 and 10 are placed when the parts are assembled.

When the parts are assembled, they are held together by rods 11, which extend through holes in the side boards just outside the ends referred to. At one end these rods have cranks 12 and collars 13 and at the other end are threaded to receive nuts 14. By means of these crank-rods the parts are tightened in an obvious manner and held together while the material is poured in the molds and while the posts are setting. When they are set, the rods are unscrewed, allowing the sides to loosen and fall apart, so that the posts may be readily removed.

To make posts of smaller size, the bottoms of the molds are blocked up by means of strips 15, (shown in Fig. 6,) which are inserted under the bottom and raise the same to a corresponding extent, and accordingly the distance between the sides is made smaller by means of boards 16, which are put in place against the sides 6. The thickness of these boards and the thickness of the strips 15, placed under the bottom of the molds, fixes the size of the posts.

It will be seen that the two rods 11 fasten all the parts together, and a number of posts can be cast simultaneously. The parts can all be readily got out of ordinary lumber, except the binding-rods, which are simple and cheap in construction. The absence of special parts or appliances is noticeable, and the whole forms a cheap and easy means for casting a number of fence-posts at once and for varying the size thereof, as desired.

What I claim as new, and desire to secure by Letters Patent, is—

1. A plural mold comprising a plurality of separate sides, a plurality of bottom pieces therebetween, having cleats thereon, end pieces fitting between the sides, upon the bottom pieces and against the cleats, and rods extending through the sides, at the ends thereof, and binding the parts together.

2. A plural mold comprising a series of separate sides, ends therebetween, separate bottoms adjustable between the respective sides, removable inner boards placed against the sides, to vary the size of the molds, and binding-rods extending between the outer sides.

In testimony whereof I have signed my name to this specification in the presence of two subscribing witnesses.

JACOB P. PLATTENBERGER.

Witnesses:
    DANIEL S. BERRY,
    THOMAS KELLY.